3,190,827
APPARATUS FOR CLEANING LIQUIDS

Johannes Antonie Kok and Casper Ebeline Gerardus Martinus Maria van Vroonhoven, both of Emmasingel, Eindhoven, Netherlands, assignors to North American Philips Company, Inc., New York, N.Y., a corporation of Delaware
Filed Oct. 4, 1961, Ser. No. 142,915
Claims priority, application Netherlands, Oct. 6, 1960, 256,599
5 Claims. (Cl. 204—302)

Apparatuses are known which are provided with two spaced electrodes between which an electric potential difference can be produced.

Such apparatus, referred to also as Cottrell filters, are used solely for separating impurities, such as fly-ash, from gases.

The invention provides such an apparatus which satisfactorily lends itself to the rapid and through purification of liquids.

We have in mind, for example, oils for capacitors or the expensive silicone oils.

If a Cottrell filter is simply used for cleaning a liquid which is passed along the electrodes, it is found that the contaminating particles which are charged are driven to the positive electrode at a certain speed. The particles become detached from the said electrode wall, particularly when the liquid is drained off. It has been found empirically that the liquid has to be filtered for a prolonged period of time, for example for a continuous period of 56 hours, if a far result is to be obtained.

Hence, one may conclude that a Cottrell filter is suitable for cleaning gases and vapours but is not very suited to the purification of liquids.

Cottrell filters designed for cleaning liquids have not been described in the literature.

According to the invention, an apparatus of the above-mentioned type is provided with an inlet and an outlet for a liquid to be cleaned, which is passed between the electrodes, while in the space between the electrodes is disposed a filter body of porous electrically non-conductive material capable of retaining the impurities separated from the liquid.

In an important embodiment of the invention, the filter body comprises glass particles sintered to compactness.

These particles may be moulded into a kind of briquette in a die adapted to be heated.

However, porous ceramic materials may also be used.

In one embodiment of the invention, one electrode surrounds the other (central) electrode so as to form an annular space, the filter body being annular also.

The filter body may be built up from slices which may be joined to each other by cement. Such a construction is cheaper than a long tube of porous non-conductive material.

An embodiment of the invention which is particularly advantageous in practice is characterized in that the filter body is exchangeable and surrounds the central electrode, an annular flow slit for the liquid to be cleaned being provided between the outer surface of the filter body and the surrounding annular electrode.

According to the invention, under certain circumstances the operation of the apparatus may be improved by evacuating the space between the electrodes.

In order that the invention may readily be carried into effect, two embodiments thereof will now be described more fully, by way of example, with reference to the accompanying diagrammatic drawings, in which—

Figure 1:
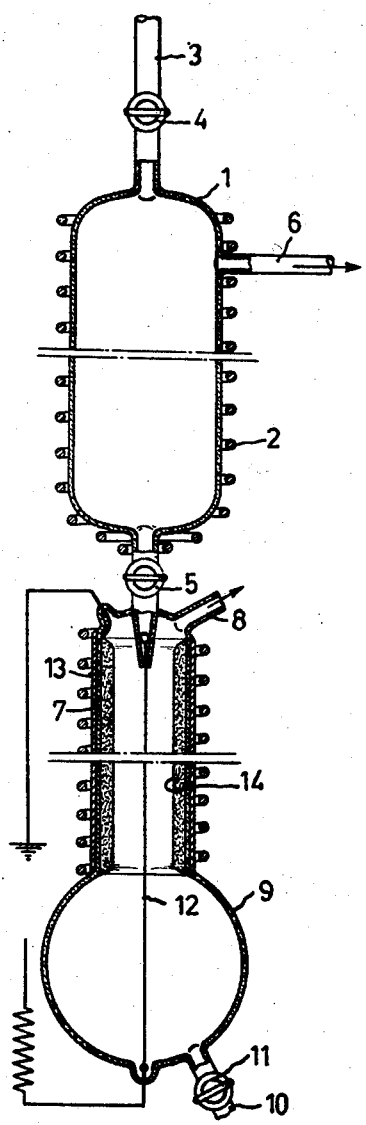
FIG. 1 is a longitudinal sectional view of a first embodiment.

In FIG. 1, a vessel 1 is provided with a heater 2, an inlet pipe 3 for the liquid to be cleaned including a cock 4, an outlet-pipe 4' including a cock 5, and a pipe 6 for producing a rough vacuum in the vessel 1.

A liquid to be purified is heated in the vessel 1 to a temperature of, for example, from 100° C. to 120° C. and through the cock 5 flows to an apparatus constructed according to the invention.

This apparatus comprises a casing 7, which may be made of glass, and is provided with a pipe 8 for connection to a high-vacuum space, a supply container 9 and an outlet pipe 10 including a cock 11.

The outlet pipe 4' is secured in the upper wall of the casing 7 in a gas-tight manner.

A central filamentary electrode 12 extends into the pipe 4' and passes through the casing 7 to the bottom of the supply container 9. An annular metal electrode 13 is provided so as to engage the wall of the casing 7. This metal electrode 13 may be provided on the inner wall of the casing 7. When a high vacuum is produced in the casing 7, the electrode 13 is preferably provided on the outer surface of the casing wall 7 in order to prevent a gas discharge. An annular filter body 14 of porous non-conductive material is arranged to engage the electrode 13.

An electric direct voltage of, for example, —60 kv. may be applied between the electrodes 12 and 13. The wire 12 is the negative electrode. In the example shown, there is a high vacuum in the casing 7 and the vessel 9, so that the liquid is satisfactorily degassed. The space in the casing 7 and the vessel 9 is preferably maintained at a temperature of from 100° C. to 120° C. also.

Liquid flowing from the pipe 4' runs down along the electrode wire 12 and is atomized by the action of the electric field along the wire 12.

Impurities are driven to the porous body 14 at high speed and retained by this body. It is found that it is very difficult to remove them from this body 14, so that the liquid drawn off at 10 is highly purified.

This apparatus may also be operated without the use of a vacuum.

By means of such an apparatus, capacitor oil having a break-down voltage of 10 kv./mm. may be cleaned to oil having a breakdown voltage of from 35 to 40 kv./mm.

Figure 2:
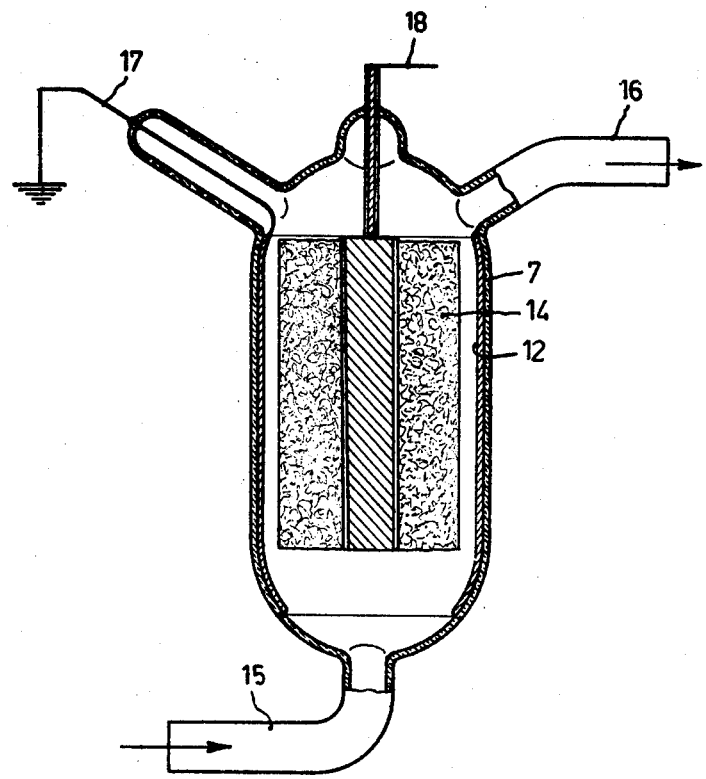
FIG. 2 is a longitudinal sectional view of a second embodiment.

FIGURE 2 shows a modified embodiment. The filter body 14 here surrounds the central electrode 12, which may be made of aluminum. A flow slit of, for example, about 1 cm. is provided between the outer surface of the filter body 14 and the annular electrode 13. The height of the body 14 may be 14 cm. and its thickness 5 cm.

In this embodiment, liquid is supplied through a pipe 15 and drawn off through a pipe 16.

A direct voltage of from —40 kv. to —70 kv. is set up between leads 17 and 18. The central electrode 12 again is the negative electrode.

A number of such apparatuses may be connected in series.

Oil having a breakdown voltage of from 5 to 10 kv./mm. may be cleaned in a series of four apparatuses according to FIGURE 2 to oil having a breakdown voltage of from 23 to 27 kv./mm. When the liquid drawn off from the battery of four apparatuses was degassed, the breakdown voltage rose to from 30 to 35 kv./mm. When the liquid is made to circulate through such a battery via a vessel, the degree of purification is found to be so high that the breakdown voltage can be improved from about 15 kv./mm. to about 80 kv./mm. Such a circulating system may be used in X-ray tubes.

The rate of flow of the oil was from 6 to 8 litres/hour.

The filter body 14 may be readily exchanged, if the casing 7 is suitably designed, for example, if it is provided with a removable cover.

The casing 7 may be made of a material other than glass, for example of metal.

The filter body preferably consists of hard glass. Scrap of glasses which are commercially available under the trade names "G28," "G40" and "Pyrex" may be used.

The body may alternatively be made of porous synthetic material for example, foamed synthetic resin, for example foamed epoxy-resin.

What is claimed is:

1. A filter apparatus for removing solid particles from a flowing liquid comprising a casing, a sleeve-shaped electrode in said casing, a central vertical electrode arranged substantially along the central axis of said sleeve-shaped electrode and spaced therefrom, a filter mass of porous, electrically non-conductive material secured to the inner wall of said sleeve-shaped electrode, means for supplying liquid to be purified to the outer peripheral surface of said central electrode whereby the liquid is distributed on said surface as a downwardly flowing film, means for applying high voltage energy between said sleeve-shaped electrode and said central vertical electrode whereby an electric field is created, said film being atomized under the influence of said electric field emanating from said central electrode and directed toward said filter mass, and a container for collecting purified liquid being arranged below the central electrode and in communication with said casing, said container being provided with a discharge device, and said filter mass consisting of glass particles which are sintered together.

2. A filter apparatus as claimed in claim 1 wherein said filter mass is annular in shape.

3. A filter apparatus as claimed in claim 1 wherein said filter mass is built up from layers which are joined to each other by cement.

4. An apparatus for purifying liquids comprising a casing, a sleeve-shaped electrode in said casing, a rod-shaped electrode arranged substantially along the longitudinal axis of said sleeve-shaped electrode, a filter mass of porous electrically non-conducting material arranged around said rod-shaped electrode whereby the outer peripheral surface of said filter mass is spaced from the inner surface of said sleeve-shaped electrode to form an annular passage for the liquid to be purified, a chamber at opposite ends of said annular passage and communicating therewith, and means for generating high voltage energy between said electrodes.

5. A filter apparatus for removing solid particles from a flowing liquid comprising a casing, an outer electrode located adjacent to said casing, a central vertical electrode arranged substantially along the central axis of said casing, and spaced therefrom, a filter mass of porous, electrically non-conductive material secured to the inner surface of said outer electrode, means for supplying liquid to be purified to the outer peripheral surface of said central electrode whereby the liquid is distributed on said surface as a downwardly flowing film, means for applying high voltage energy between said outer electrode and said central vertical electrode whereby an electric field is created, said film being atomized under the influence of said electric field emanating from said central electrode and directed toward said filter mass, and a container for collecting purified liquid arranged below the central electrode and in communication with said casing, said container being provided with a discharge device, and said filter mass consisting of glass particles which are sintered together.

References Cited by the Examiner

UNITED STATES PATENTS

| | | | |
|---|---|---|---|
| 1,831,075 | 11/31 | Neeley | 204—302 |
| 2,116,509 | 5/38 | Cottrell | 204—302 |
| 2,540,223 | 2/51 | Tolman | 204—302 |
| 2,573,967 | 11/51 | Hamlin | 204—302 |
| 2,588,111 | 3/52 | Hanneman | 204—302 |
| 2,665,246 | 1/54 | Bates | 204—320 |
| 2,867,573 | 1/59 | Wintermute | 204—314 |
| 2,914,453 | 11/59 | Wennerberg | 204—302 |

JOHN H. MACK, *Primary Examiner.*

MURRAY TILLMAN, *Examiner.*